C. H. VEEDER.
SETTING GLASS.
APPLICATION FILED APR. 2, 1913.

1,093,580.

Patented Apr. 14, 1914.

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

SETTING GLASS.

1,093,580.  Specification of Letters Patent.  Patented Apr. 14, 1914.

Application filed April 2, 1913. Serial No. 758,382.

*To all whom it may concern:*

Be it known that I, CURTIS HUSSEY VEEDER, a citizen of the United States, residing in the city of Hartford, in the State of Connecticut, have invented certain new and useful Improvements in Setting Glass, of which the following is a specification, reference being had to the accompanying drawing, forming a part hereof.

This invention relates to the setting of glass in rigid frames.

In so-called leaded windows pieces of glass constituting the glazing of the windows are usually set in lead cames which are usually formed entirely of soft metal and are channeled to receive the edges of opposite pieces of glass. The cames are stiffened sometimes but are not made rigid by the use of reinforcing strips.

This invention is not concerned with the uniting of different pieces of glass in a common frame but has for its object to provide an efficient method and means for securing a single piece of glass tightly in a rigid frame.

The invention is developed specially with reference to the securing of sight glasses in the metal casings of odometers and other registers where it is necessary to prevent the working of water, oil and fine dust into the casing.

The invention will be described more particularly with reference to the accompanying drawings in which—

Figure 1:
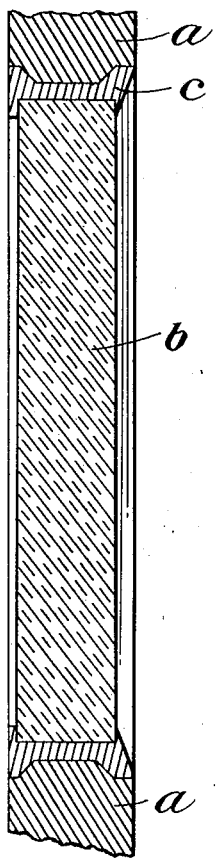
Figure 2:
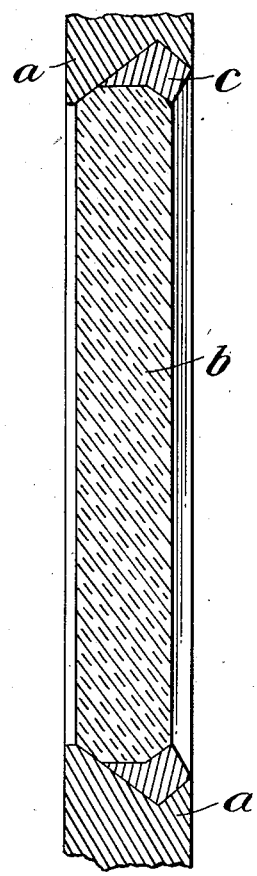

Figure 1 is a sectional view indicating a portion of a rigid frame in which is set a single glass, held in place by packing, all in accordance with the present invention. Fig. 2 is a view similar to Fig. 1 showing a modified outline for the longitudinal edges of the frame and the glass, the packing being formed to accommodate the modified forms of these edges.

The frame $a$ in which the glass $b$ is to be set is rigid and may be the frame or casing of a hub odometer or other register in which is to be mounted a sight glass. This rigid frame has its edges formed in cross section to permit the interlocking therewith of a soft metal packing $c$ which surrounds the edge of the glass $b$ and interlocks therewith. This soft metal packing $c$ may be composed of any desired constituents but an alloy of lead and tin of equal parts has been found to meet satisfactorily the conditions of use of a packing of this character. In setting the glass in the frame the packing may be cast in a form substantially similar to that which it will assume after being placed in position. The glass is then positioned within the frame, a suitable space being left between its edge and the frame. The soft metal packing $c$ may next be forced into position between the frame and the glass by suitable dies and preferably under pressure so as to form a firm bond between the frame and the glass.

As shown in Fig. 1 the soft metal packing interlocks with the edge of the frame and is upset over the glass so as to interlock therewith. The result is a secure union between the rigid frame and the glass which not only holds the glass rigidly in position but prevents water or dust from working through the union between the rigid frame and the glass. When the glass is set in the casing of registers this water tight and dust tight construction is of particular importance as will be understood.

In Fig. 2 the longitudinal edges of the frame $a$ are shown as being grooved while the glass $b$ has its edges beveled so that while one beveled surface may abut directly against one wall of the groove in the frame the other beveled surface is engaged by the soft metal packing $c$, the outer face of which rests against the opposite wall of the groove in the rigid frame, while the inner portion is upset over the beveled edge of the glass. The result is an interlocking engagement of the metal packing with the edge of the glass and with the rigid frame so that the glass is held firmly in its position within the frame and a union of substantially the same character as that described with reference to the mounting in Fig. 1, is secured.

It will be evident that the cross sectional form of the longitudinal edges of the rigid frame $a$ and the single glass $b$ may be varied at will without departing from the spirit of the invention, so long as the soft metal packing is employed in combination with these two parts in substantially the manner pointed out with reference to the constructions illustrated in the drawings.

I claim as my invention:

1. In combination, a frame, the inner peripheral surface of which is cut to form a locking member, a glass, and a ring of malleable metal having one surface formed in locking relation to the said locking member and adapted to be forced between said frame and said glass to thereby interlock with the frame and support the glass.

2. In combination, a frame, the inner peripheral surface of which is cut to form a locking member, a glass, a ring of malleable metal having two surfaces formed parallel with the peripheral surfaces of said frame, and adapted to be forced between said frame and said glass to interlock with said frame and support the glass.

3. In combination, a frame, having interior surfaces disposed in synclinal relation, a glass having its edges formed parallel with the interior surfaces of said frame, and a ring of malleable metal adapted to be inserted between said frame and glass, said ring having two of its surfaces parallel with the interior surfaces of the frame, its opposite surfaces parallel with an edge and the top of the glass, so that the glass will contact at one edge with the frame, and at the other edge and top with said metal ring to be thereby held in a locked position.

This specification signed and witnessed this 31st day of March A. D. 1913.

CURTIS HUSSEY VEEDER.

Signed in the presence of—
CHARLES G. ALLYN,
MARGARET NOONAN.

---

Copies of this patent may be obtained for five cents each, by addressing the "Commissioner of Patents, Washington, D. C."